(12) United States Patent
Danneberg et al.

(10) Patent No.: US 11,571,752 B2
(45) Date of Patent: Feb. 7, 2023

(54) METHOD FOR MACHINING A CRANKCASE AND MACHINING DEVICE

(71) Applicant: Bayerische Motoren Werke Aktiengesellschaft, Munich (DE)

(72) Inventors: Frank Danneberg, Ergolding (DE); Wolfram Wagener, Geisenhausen (DE); Patrick Woisetschlaeger, Landshut (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 88 days.

(21) Appl. No.: 16/979,925

(22) PCT Filed: Feb. 19, 2019

(86) PCT No.: PCT/EP2019/054024
§ 371 (c)(1),
(2) Date: Sep. 11, 2020

(87) PCT Pub. No.: WO2019/174866
PCT Pub. Date: Sep. 19, 2019

(65) Prior Publication Data
US 2021/0008646 A1    Jan. 14, 2021

(30) Foreign Application Priority Data
Mar. 14, 2018   (DE) ................. 10 2018 203 886.4

(51) Int. Cl.
*B23B 41/12*    (2006.01)
*B23P 9/02*    (2006.01)

(52) U.S. Cl.
CPC ............... *B23B 41/12* (2013.01); *B23P 9/02* (2013.01)

(58) Field of Classification Search
CPC ... B23B 41/12; B23P 9/02; B23P 9/00; B23C 3/34; B23D 45/10; C23C 4/02;
(Continued)

(56) References Cited

U.S. PATENT DOCUMENTS

| 4,980,996 A * | 1/1991 | Klink ...................... B24B 29/08 |
| | | 29/888.06 |
| 5,191,864 A * | 3/1993 | Santi ........................ F02F 1/00 |
| | | 123/193.2 |

(Continued)

FOREIGN PATENT DOCUMENTS

| CN | 101379212 A | 3/2009 |
| CN | 101928908 A | 12/2010 |

(Continued)

OTHER PUBLICATIONS

International Search Report (PCT/ISA/210) issued in PCT Application No. PCT/EP2019/054024 dated Jun. 21, 2019 with English translation (five (5) pages).

(Continued)

*Primary Examiner* — Lee A Holly
(74) *Attorney, Agent, or Firm* — Crowell & Moring LLP

(57) ABSTRACT

A method for machining a crankcase includes providing a machining device. The machining device comprises a mechanical machining unit and a cooling/rinsing system, which is configured to cool and/or rinse the mechanical machining unit or a surface which is to be machined. The method also includes creating a structure in a cylinder wall of a crankcase using the mechanical machining unit. The method also includes using a fluid stream of the cooling/rinsing system to reshape at least certain regions of the structure.

11 Claims, 1 Drawing Sheet

(58) Field of Classification Search
CPC ......... C23C 4/129; C23C 4/131; C23C 24/08; B23K 26/355; B23K 26/3584; B24C 3/325; F16J 10/02
See application file for complete search history.

(56) References Cited

U.S. PATENT DOCUMENTS

| | | | | |
|---|---|---|---|---|
| 5,380,564 | A * | 1/1995 | VanKuiken, Jr. | C23C 4/02 427/455 |
| 5,441,439 | A * | 8/1995 | Grimm | B23K 26/355 451/28 |
| 2007/0212519 | A1 | 9/2007 | Nishimura et al. | |
| 2009/0129879 | A1 * | 5/2009 | Sadaoka | B23Q 1/4876 408/152 |
| 2009/0175571 | A1 | 7/2009 | Boehm et al. | |
| 2010/0031799 | A1 | 2/2010 | Ast et al. | |
| 2010/0326270 | A1 | 12/2010 | Doerfler et al. | |
| 2012/0094063 | A1 * | 4/2012 | Hasegawa | B23K 26/3584 219/69.15 |
| 2014/0360355 | A1 * | 12/2014 | Whitbeck | F16J 10/02 92/169.1 |
| 2016/0115578 | A1 * | 4/2016 | David | B24C 3/325 427/446 |
| 2016/0130691 | A1 | 5/2016 | Wang | |
| 2016/0169149 | A1 | 6/2016 | Hahn et al. | |
| 2016/0208370 | A1 | 7/2016 | Bauer et al. | |
| 2019/0210119 | A1 | 7/2019 | Teusch | |

FOREIGN PATENT DOCUMENTS

| | | |
|---|---|---|
| CN | 102015166 A | 4/2011 |
| CN | 102803545 A | 11/2012 |
| CN | 104227109 A | 12/2014 |
| CN | 105307817 A | 2/2016 |
| CN | 105648381 A | 6/2016 |
| CN | 206035657 U | 3/2017 |
| DE | 37 19 796 A1 | 12/1988 |
| DE | 10 2006 004 769 A1 | 8/2007 |
| DE | 10 2011 002 813 A1 | 7/2012 |
| DE | 10 2013 211 324 A1 | 12/2014 |
| DE | 10 2013 014 844 A1 | 3/2015 |
| DE | 10 2016 216 464 A1 | 3/2018 |
| EP | 2794167 B1 | 3/2018 |
| JP | 2005-194938 A | 7/2005 |
| JP | 2006117993 A | 5/2006 |
| JP | 2011-1613 A | 1/2011 |
| WO | WO 2015/003790 A1 | 1/2015 |

OTHER PUBLICATIONS

German-language Written Opinion (PCT/ISA/237) issued in PCT Application No. PCT/EP2019/054024 dated Jun. 21, 2019 (seven (7) pages).

German-language Search Report issued in German Application No. 10 2018 203 886.4 dated Sep. 4, 2018 with partial English translation (13 pages).

English translation of Chinese Office Action issued in Chinese Application No. 201980009361.3 dated Jun. 25, 2021 (nine (9) pages).

* cited by examiner

METHOD FOR MACHINING A CRANKCASE AND MACHINING DEVICE

BACKGROUND AND SUMMARY OF THE INVENTION

Embodiments of the present invention relate to a method for machining a crankcase and also to a machining device.

Cylinder running surfaces of combustion engines are often provided nowadays with a coating which is applied, for example, by means of a thermal spraying method, such as electric arc wire spraying. In order for this coating to have better retention properties, the cylinder surface is "activated" prior to being coated. This activation consists, for example, in a structure being created in the cylinder wall, for example in the form of grooves and ridges. This creation operation takes place, for example, mechanically. A corresponding tool is disclosed, for example, in WO 2015/003790 A1, which relates to a method for machining a wall of a cylinder of a combustion engine, use being made of an annular saw blade for this purpose. However, the grooves, for example rectangular grooves, generated here are often not sufficient to provide for reliable adhesion, and therefore the structure generated has to be reshaped in a further operating step to form undercuts, which promote in particular a form fit with the subsequently applied coating. The aforementioned document proposes a rolling tool for this purpose. In principle, however, the use of a plurality of tools, or in general the implementation of multi-stage machining, involves a high level of manufacturing outlay. Added to this is the fact that the tools, in particular also the aforementioned rolling tool, are exposed to a not insignificant amount of wear.

It is therefore one object of the embodiments of the present invention to eliminate the aforementioned disadvantages and to specify a rapid and cost-effective method for machining a crankcase and also a corresponding machining device.

This and other objects are achieved by a method for machining a crankcase comprises the following steps:
providing a machining device, wherein the machining device comprises a mechanical machining unit and a cooling/rinsing system, which is provided for cooling and/or rinsing the mechanical machining unit or a surface which is to be machined;
creating a structure in a cylinder wall of a crankcase using the mechanical machining unit;
using a fluid stream of the cooling/rinsing system to reshape at least certain regions of the structure.

According to one embodiment, the machining device is a cutting tool which is intended for use in or on a cylinder of a crankcase of a combustion engine and is designed to generate (rectangular) grooves, or recesses in general, in the cylinder wall, these grooves or recesses preferably running along the cylinder wall without any gradient. This has the advantage that a uniform (surface) structure is generated even in the end regions of the cylinder. If the grooves have a gradient, this can result in the end regions of the cylinder having relatively large regions or surface areas which have no groove (cf. the end point of a thread). Nevertheless, it is however also quite possible, according to one embodiment, for grooves with a gradient to be provided. Moreover, the grooves need not necessarily be rectangular. The critical factor is that the cooling/rinsing system, in particular the machining-device fluid stream, which is preferably already present for this purpose, is advantageously used to reshape, or (plastically) deform, at least certain regions of the structure created by the mechanical machining unit, for example in the form of the aforementioned (rectangular) grooves. In particular, the reshaping operation expediently takes place so as to form undercuts, which have proven to be particularly advantageous since a layer or coating which is subsequently applied, for example by means of a thermal spraying method, such as electric arc wire spraying, can interlock with this geometry. Expediently, the fluid stream is thus used such that the structure created by the mechanical machining unit is deformed or reshaped, in particular plastically reshaped, in such a manner as to result in a macro-interlocking with the coating. It is expediently the case that the fluid stream is used to generate one or more fluid jets, which are directed onto the cylinder wall so as to achieve the desired reshaping. "Fluid jet" is referred to here when, as it were, the fluid stream has "left" the machining device or the tool. Using the fluid stream of the cooling/rinsing system gives rise, in particular, to the advantage that the system operates in a completely wear-free manner and can be easily readjusted, for example via the control parameters pulse frequency, pressure and/or amount of particles in the fluid stream or fluid jet.

Accordingly, the method preferably comprises, thereafter, the following step:
applying a coating by means of a thermal spraying method, such as for example electric arc wire spraying.

In addition, it is also possible to use other spraying methods, such as for example gas dynamic cold spraying.

According to a preferred embodiment, the method comprises the following step:
generating at least one pulsed fluid jet for reshaping purposes.

The fluid stream of the cooling/rinsing system is expediently used to generate a pulsed fluid jet or is converted into the same. The pulsing of the fluid stream or of the fluid jet gives rise to a very great amount of kinetic energy in this fluid stream or fluid jet, as a result of which the structure can be deformed or reshaped.

This effect can be additionally enhanced by solid bodies or particles being added into the fluid stream or fluid jet. Accordingly, the method preferably comprises the following step:
introducing particles into the fluid stream or into the (at least one) fluid jet.

The particles can be glass beads or corundum or the like.

According to one embodiment, the method comprises the following step:
roughening the cylinder wall and/or the structure with the at least one fluid jet.

It is advantageously not just the case that the structure is, or can be, reshaped or deformed. It is expediently the case that it is also, in addition, roughened, in particular also by the aforementioned particles or solid bodies being added. Accordingly, it is advantageously possible for the fluid stream or the fluid jet to bring about not just macro-interlocking, but also micro-interlocking, for example in the form of the roughening of the cylinder wall or of the structure.

According to one embodiment, the method comprises the following step:
generating a fan-like fluid jet.

According to one embodiment, the fan-like fluid jet is oriented such that it is directed along a cylinder axis, as a result of which the cylinder wall is machined over a large surface area, as it were, in the vertical direction.

According to one embodiment, the method comprises the following step:

generating rectangular grooves using the mechanical machining unit, in particular generating rectangular grooves which do not have any gradient in relation to the cylinder axis.

In addition, it is also nevertheless possible to provide other cross-sectional shapes, for example round or triangular ones or also punctiform or slot-form cross-sectional shapes, etc. In general terms, the structure is, in particular, a surface structure which is distinguished by a series of grooves and ridges, or high points and low points, that is to say a structure which is suitable for being deformed or reshaped so as to give rise, as far as possible, to undercuts, which have proven to be particularly advantageous for subsequent (thermal) coating.

The embodiments of the invention also relate to a machining device or a tool for surface activation, comprising a mechanical machining unit and also a cooling/rinsing system, wherein the mechanical machining unit is designed to generate a structure in a cylinder wall of a crankcase, and wherein the machining device comprises an additional system, which is designed to use a fluid stream of the cooling/rinsing system to reshape the structure. According to one embodiment, the machining device is a cutting tool which has a cooling flow, in particular an internal cooling flow. The cooling flow or the cooling system, which is used to cool and to rinse the tool or the component surface which is to be machined, advantageously exits at a cooling/rinsing channel of the tool and is used to reshape the structure generated by the tool or the machining device. The additional system is expediently designed to pulse the cooling/rinsing medium, for example by way of a corresponding valve system. It is expediently possible for such a valve system to be integrated in an existing system or in an existing machining device, in other words to be retrofitted. Technical implementation is possible here in a number of different ways. The critical factor is that, by using the cooling/rinsing system or modification or adaptation thereof, the machining device very easily provides for rapid and effective crankcase machining.

According to one embodiment, the mechanical machining unit comprises a multiplicity of circumferentially distributed cutting elements. According to one embodiment, the cutting elements are oriented along a cylinder axis, wherein, according to one embodiment, they have a for example comb-like profile, in order to generate grooves in the cylinder wall of the crankcase. As an alternative, it is also possible for the mechanical machining device to have one or more saw blades, which are arranged possibly along a vertical axis of the tool or along a cylinder axis. Further, or alternative, configurations are likewise conceivable.

According to one embodiment, at least one fluid outlet, preferably also more than one, is provided between the circumferentially arranged cutting elements. The fluid outlets are expediently the already mentioned cooling and rinsing channels of the machining device, these possibly already being present in any case. However, the additional system modifies the fluid stream, in particular by the pulsing, such that it is also suitable for reshaping or deforming the structure provided by the mechanical machining unit.

According to one embodiment, a plurality of fluid outlets are arranged in a row, for example along the aforementioned cylinder axis. In particular in conjunction with the aforementioned circumferentially distributed cutting elements, this has proven to be particularly advantageous with regard to the reshaping properties.

The features and advantages mentioned in conjunction with the method also apply to the machining device, and vice versa. Further advantages and features can be gathered from the following description of one embodiment of the method and of a machining device with reference to the accompanying figures. Various features can be combined with one another here within the context of the invention. In the figures:

DETAILED DESCRIPTION OF THE DRAWINGS

Figure 1:
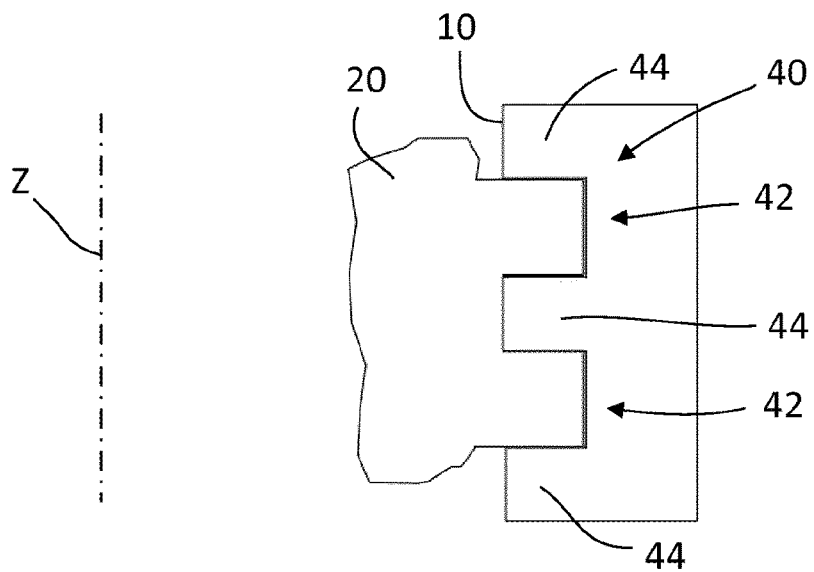
FIG. 1 is a schematic detail-specific view of a machining device, the mechanical machining unit of the latter engaging in a cylinder wall.

FIG. 1 shows a partial view of a crankcase, in particular a cylinder wall 10, the reference sign Z denoting a cylinder axis. Reference sign 20 denotes a schematically illustrated detail of a cutting element of a mechanical machining unit of a machining device (not otherwise illustrated any more specifically), which is provided to create grooves 42 in the cylinder. The result is a series of ridges 44 and grooves 42 along the cylinder axis Z, this giving rise to a structure 40 being formed.

Figure 2:
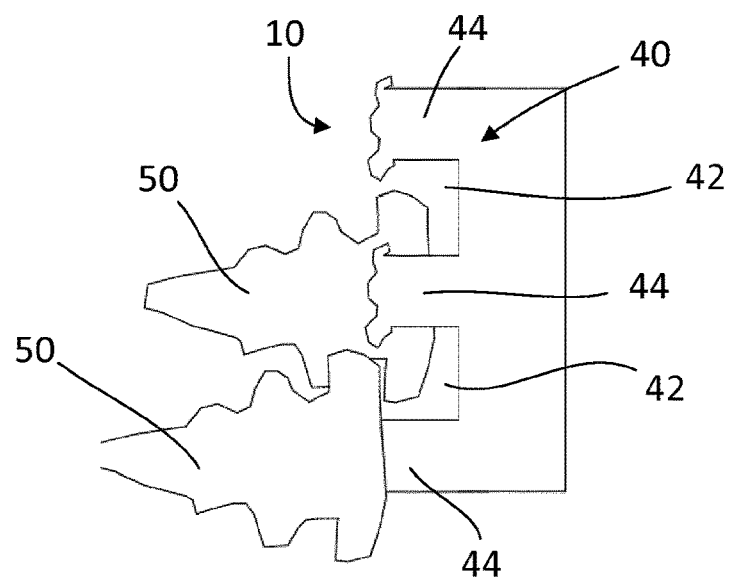
FIG. 2 is a schematic view of a reshaping operation by means of a fluid jet.

FIG. 2, then, shows how the structure is, or in particular the ridges 44 are, reshaped or deformed via fluid jets 50, wherein on the one hand a surface of the cylinder wall 10 is roughened, it also being possible for this operation to be enhanced, if appropriate, by virtue of particles being introduced into the fluid jet or jets 50, and on the other hand the ridges 44 are reshaped to form undercuts.

Figure 3:
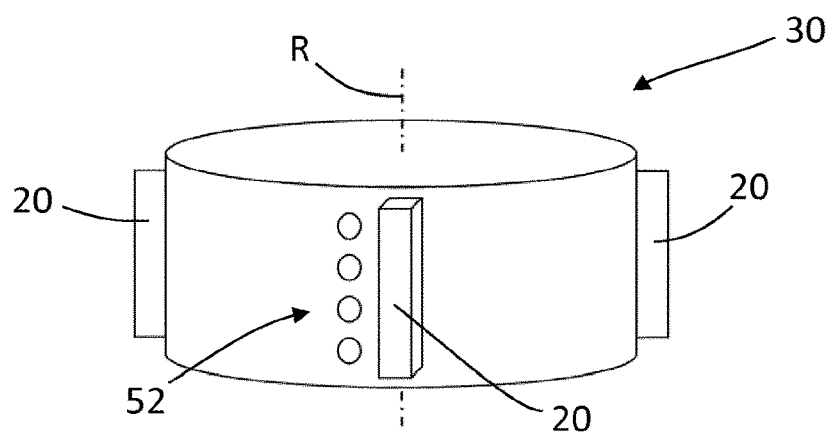
FIG. 3 is a schematic view of one embodiment of a machining device.

FIG. 3 shows, schematically, a machining device or a (tool) segment of a machining device, wherein the machining device comprises a mechanical machining unit which, in the embodiment shown here, has for example circumferentially arranged cutting elements 20. The latter have (not illustrated here) for example a comb-like profiling (cf. also FIG. 1) in order to generate grooves and ridges, as are depicted in FIGS. 1 and 2. The reference sign 52 denotes fluid outlets, which extend along an axis of rotation R of the machining device, or along a cylinder axis (not illustrated here), and are arranged circumferentially between the cutting elements 20. Via the fluid outlets 52, fluid jets are applied, preferably in pulsed form, to a cylinder wall, this making it possible to reshape a (e.g. mechanically) created structure, as depicted in FIG. 2. As mentioned above, the component which can be seen in FIG. 3 is, for example, a tool segment of a machining device, wherein the machining device can have a multiplicity of such tool segments one above the other along the axis of rotation R of the machining device. The internal cooling/rinsing system is not depicted anymore specifically. It is expediently possible for existing machining devices to be easily converted or for an additional system which is designed to use the fluid stream of the cooling/rinsing system to reshape the structure generated by the mechanical machining unit to be easily integrated in an existing system. Using the fluid stream of the cooling/rinsing system gives rise here, in particular, to the advantage that the system operates in a completely wear-free manner and can be easily readjusted, for example via the control parameters pulse frequency, pressure or amount of the particles in the fluid stream.

LIST OF REFERENCE SIGNS

10 Cylinder wall
20 Cutting element

30 Tool segment
40 Structure
42 Groove
44 Ridge
50 Fluid jet
52 Fluid outlet
R Axis of rotation
Z Cylinder axis

What is claimed is:

1. A method for machining a crankcase, comprising the acts of:
providing a machining device, wherein the machining device comprises a mechanical machining unit and a cooling/rinsing system, which is configured to cool and/or rinse the mechanical machining unit or a surface which is to be machined;
creating a structure in a cylinder wall of a crankcase using the mechanical machining unit; and
using a fluid stream of the cooling/rinsing system to reshape at least certain regions of the structure, wherein the fluid stream reshapes at least certain regions of the structure by plastically deforming the material.

2. The method according to claim 1, further comprising: generating at least one pulsed fluid jet configured to reshape the structure.

3. The method according to claim 2, further comprising: generating a fan fluid jet, wherein the fan fluid jet is a fluid jet oriented such that it is directed along a cylinder axis.

4. The method according to claim 3, further comprising: generating rectangular grooves using the mechanical machining unit.

5. The method according to claim 2, further comprising: introducing particles into the at least one fluid jet.

6. The method according to claim 2, further comprising: roughening the cylinder wall and/or the structure using the at least one fluid jet.

7. The method according to claim 1, wherein the structure is defined as a series of grooves and ridges.

8. A machining device for surface activation, comprising:
a mechanical machining unit; and
a cooling/rinsing system, wherein
the mechanical machining unit is configured to generate a structure in a cylinder wall of a crankcase, and
the machining device comprises an additional system, which is configured to use a fluid stream of the cooling/rinsing system in order to reshape the structure, wherein
the fluid stream reshapes at least certain regions of the structure by plastically deforming the material.

9. The machining device according to claim 8, wherein at least one fluid outlet is provided circumferentially between cutting tools of the machining unit.

10. The machining device according to claim 9, wherein a plurality of fluid outlets are arranged in a row.

11. The machining device according to claim 8, wherein the mechanical machining unit further comprises a multiplicity of circumferentially distributed cutting elements.

* * * * *